United States Patent [19]

Dester et al.

[11] Patent Number: 5,288,143
[45] Date of Patent: Feb. 22, 1994

[54] TRACK ROLLER ASSEMBLY HAVING A REPLACEABLE FLANGE

[75] Inventors: Delbert D. Dester, Washington; Daniel L. Mikrut, Peoria, both of Ill.

[73] Assignee: Caterpillar Inc., Peoria, Ill.

[21] Appl. No.: 4,442

[22] Filed: Jan. 14, 1993

[51] Int. Cl.⁵ .............................................. B62D 55/14
[52] U.S. Cl. ......................................... 305/56; 305/24
[58] Field of Search .................... 305/21, 23, 24, 27, 305/28, 56, 57

[56] References Cited

U.S. PATENT DOCUMENTS

| | | | |
|---|---|---|---|
| 2,647,025 | 7/1953 | Deffenbaugh | 308/187.1 |
| 2,915,346 | 12/1959 | Stallman | 305/28 |
| 3,147,048 | 9/1964 | Johnson et al. | 308/18 |
| 3,580,093 | 5/1971 | Tomizawa | 74/230.3 |
| 3,797,895 | 3/1974 | Tomizawa | 305/27 |
| 3,869,931 | 3/1975 | Boggs | 305/28 X |
| 3,910,128 | 10/1975 | Boggs et al. | 74/230.01 |
| 3,996,810 | 12/1976 | Groff | 74/230.3 |
| 4,890,892 | 1/1990 | Haslett | 305/25 |
| 5,040,855 | 8/1991 | Diekevers | 305/24 |

Primary Examiner—Russell D. Stormer
Attorney, Agent, or Firm—Claude F. White

[57] ABSTRACT

A track roller assembly supports and guides the link rails of the endless track of a track-type vehicle as the endless track travels along the ground. Contact between the link rails and the roller assembly is at the tread portion of the roller. A replaceable tread ring on the roller tread portion has a non-metallic outer tread portion which contacts the link rails. The tread ring is held in place by a replaceable flange plate. A separate seal plate holds the various seals in place when the flange plate is removed for replacement of the tread ring or the flange plate. Conventional track roller assemblies have non-replaceable flange plates and metal tread portions which produce considerable wear on the mating link rails. The subject roller assembly prolongs the useful life of the link rails and provides an easily replaceable flange plate and tread ring.

15 Claims, 4 Drawing Sheets

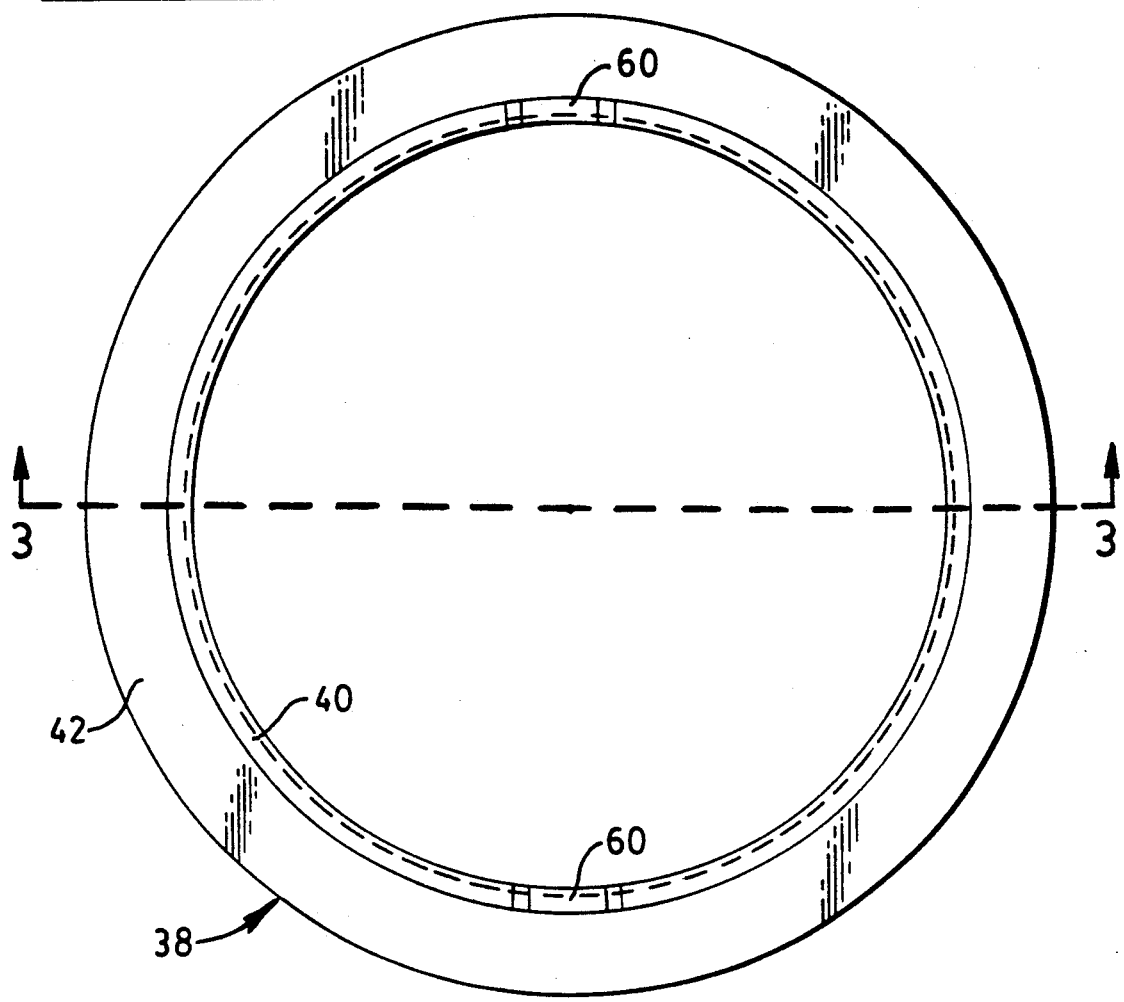
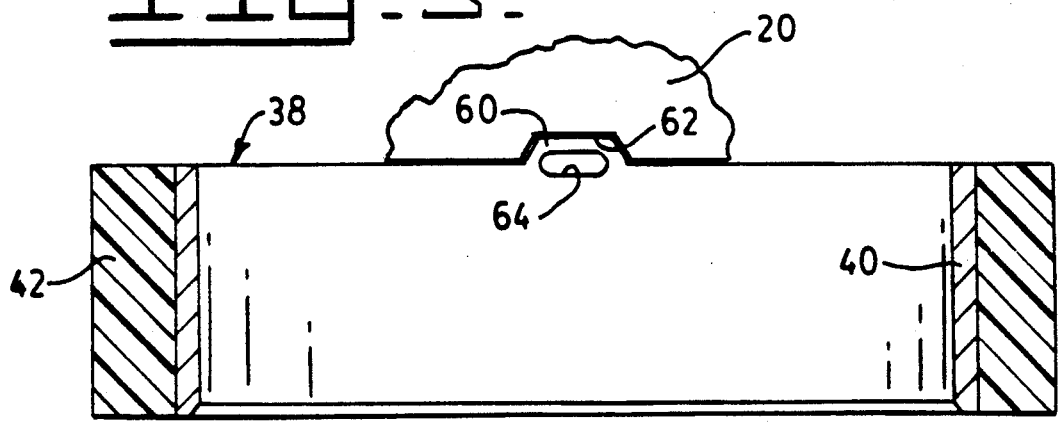

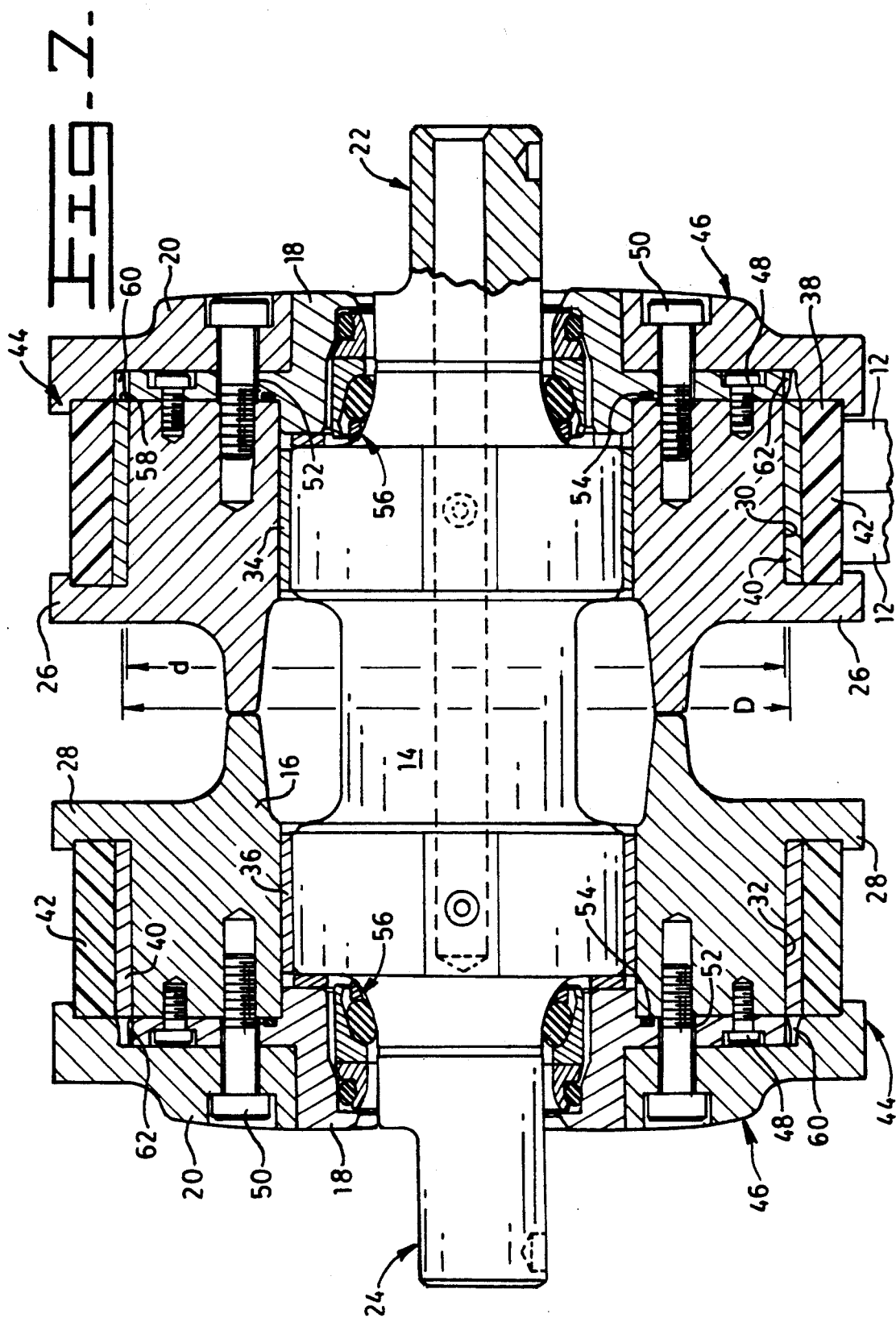

5,288,143

TRACK ROLLER ASSEMBLY HAVING A REPLACEABLE FLANGE

TECHNICAL FIELD

This invention relates generally to a track roller assembly for supporting and guiding the endless track of a track type vehicle, and more particularly to a track roller assembly having a replaceable flange plate for retaining a tread ring in place on the roller assembly.

BACKGROUND ART

Self-laying track-type vehicles utilize an endless track chain assembly joined together by interconnected link assemblies. The link assemblies include overlapping link members which form a pair of continuous rails. A plurality of roller assemblies bear the vehicle's weight, and guide the track chain by engaging the link rails as the chain assembly rotates about a drive sprocket wheel and one or more idler wheels. The roller assemblies rotate from frictional engagement with the link rails. Considerable noise and vibration is generated from the metal to metal contact of the roller treads with the link rails. The noise and vibrations are sometimes magnified by other components of the vehicle. Additionally, the continuous contact between the rails and the roller treads produces wear of the two components with resulting replacement or repair. Such replacement or repair increases the operating cost and downtime of the vehicle.

One type of track roller having a replaceable rim and an elastic ring below the rim is disclosed in U.S. Pat. No. 3,580,093, issued on May 25, 1971, to K. Tomizawa. The replaceable rim is a metal ring and the elastic ring is made of rubber or synthetic resin. An end plate having an outer flange is secured to the roller hub and holds the rim and elastic ring in place. This arrangement requires the outer flanged plates to hold the rim and elastic ring in place.

Another type of track roller having a resilient mounted tread is disclosed in U.S. Pat. No. 3,910,128, issued on Oct. 7, 1975, to R. L. Boggs et al. The tread portion of this roller includes an inner resilient collar and an outer metallic ring. The tread portions are held between a pair of flanges and the flanges are secured in place by threaded retaining means. This particular arrangement would appear to function satisfactorily for its intended purpose. However, this assembly contains a considerable number of parts and requires time and effort to assemble the parts together.

The present invention is directed to overcoming one or more of the problems as set forth above.

DISCLOSURE OF THE INVENTION

In one aspect of the invention, a track roller assembly for guiding and supporting an endless track of a self-laying track-type vehicle includes a shaft mounted to the vehicle, a hub member mounted on the shaft, and a seal plate secured to the hub member. The roller assembly further includes a replaceable tread ring mounted on the hub member, and a replaceable flange plate engaging the tread ring and secured to the hub member.

In another aspect of the invention, a replaceable composite tread ring for a roller assembly includes a non-metallic tread portion, and a metallic base portion having a Unshape in cross-section. The base portion is bonded to the tread portion and encloses portions of the non-metallic tread portion.

Continuous frictional rolling contact between the metal link rails and the metal roller treads of prior art endless track assemblies produces wear of the link rails and roller treads. This wear results in repair or replacement of the links or rollers, or both. The continuous contact between the moving link rails and the rollers also generates considerable noise.

The subject roller assembly with replaceable flange and replaceable composite tread ring, with non-metallic tread portion, reduces the wear on the links and rollers and makes replacement of the roller treads quick and simple. The flange plate is also quickly and easily replaceable. The subject invention also reduces the noise generated by contact between the rollers and link rails. By reducing wear, the useful life of the undercarriage parts is increased and operating and maintenance costs are reduced, thereby providing increased value to the vehicle owner.

BRIEF DESCRIPTION OF THE DRAWINGS

FIG. 2 is a diagrammatic plan view of a composite tread ring of the present invention;

FIG. 3 is a diagrammatic sectional view taken generally along the lines 3—3 of FIG. 2;

FIG. 7 is a diagrammatic sectional view of the track roller assembly of the present invention.

BEST MODE FOR CARRYING OUT THE INVENTION

Figure 1:
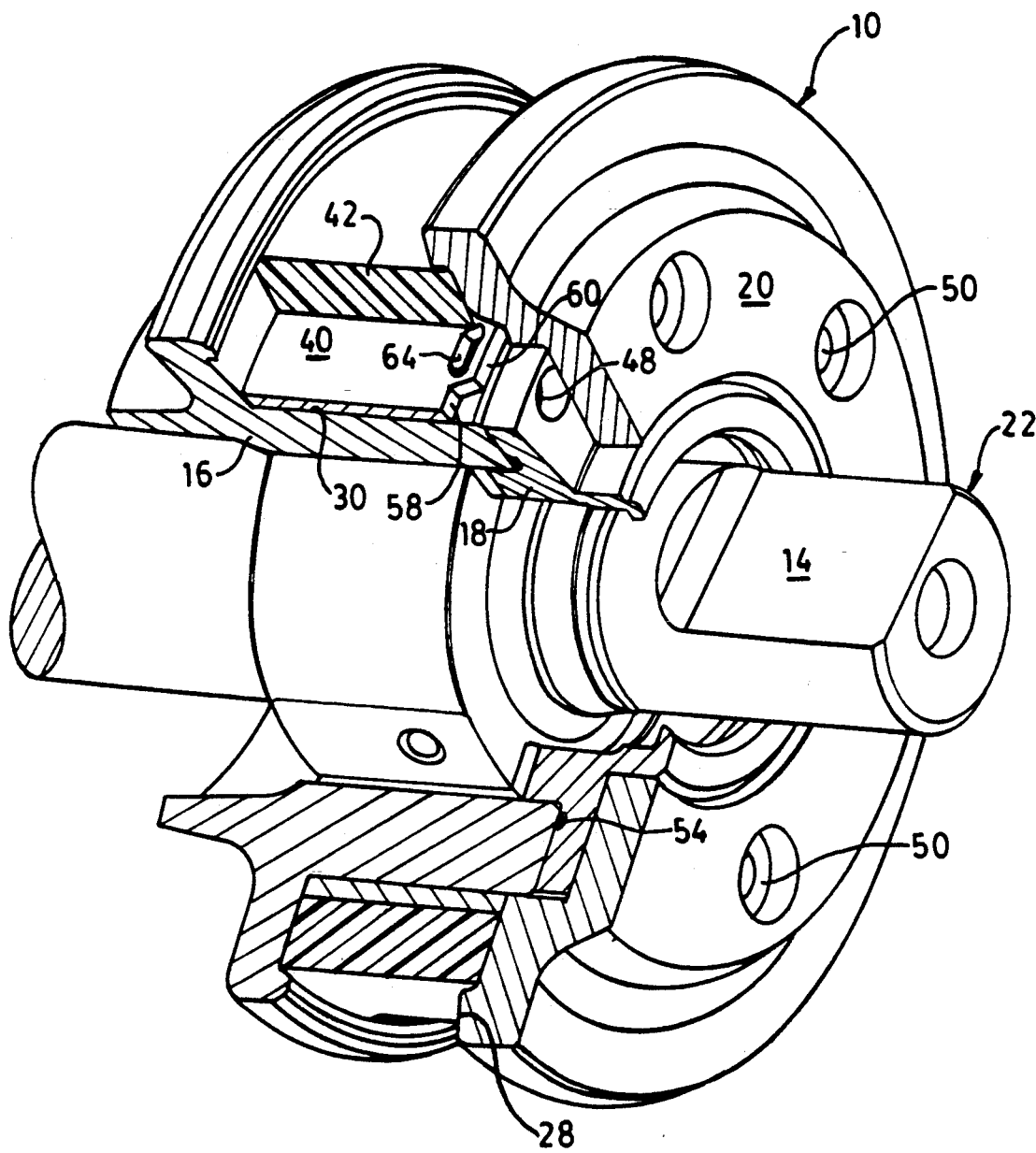
FIG. 1 is a diagrammatic perspective view of a portion of the subject track roller assembly with portions in section.

With reference to the drawings, a track roller assembly 10 for guiding and supporting the link rails 12 of an endless track of a self-laying track-type vehicle includes a shaft 14, a hub member 16, seal plates 18, and replaceable flange or retainer plates 20. The shaft 14 has first and second end portions 22,24 which are adapted to secure the roller assembly 10 to the vehicle. The hub member 16 has first and second flange portions 26,28 and first and second support portions 30,32, and is rotatably mounted on the shaft 14 by first and second sleeve bearings 34,36. A replaceable tread ring 38 is mounted on each of the first and second support portions 30,32. Preferably, the tread ring 38 is a composite ring and includes an inner metallic base portion 40 and an outer non-metallic tread portion 42, with the inner base portion 40 and outer tread portion 42 being bonded together.

Each replaceable flange plate 20 includes a flanged area 44 and a mounting area 46 with the flange area 44 being adapted to engage the tread ring 38 and the mounting area 46 adapted to engage and substantially encircle the seal plate 18. A plurality of first threaded fasteners 48 are adapted to releasably secure the seal plates 18 to the hub member 16, and a plurality of second threaded fasteners 50 are adapted to releasably secure the flange plates 20 to the hub member 16. The seal plate 18 includes a plurality of through holes 52 to accommodate the second fasteners 50. The roller assembly 10 includes a plurality of metal to metal seal assemblies 56 positioned between the shaft 14 and the seal plate 18, and a resilient seal 54 between the seal plate 18 and the hub member 16. The seal plates 18 maintains the seals 54 and seal assemblies 56 in place when the flange plates 20 are removed.

The tread rings 38 are adapted to slide onto the support portions 30,32 and therefore include an inner diameter dimension D which is slightly greater than the outer diameter dimension d of the support portions 30,32. In order to prevent rotation of the tread rings 38, the base portion 40 of each tread ring 38 has a side surface 58 and preferably includes one or more projections 60 extending outwardly of the side surface. Each of the flange plates 20 has one or more slots or cavities 62 and each cavity 62 is adapted to receive one of the projections 60 to thereby prevent rotation of the tread rings 38. Preferably, each tread ring 38 includes at least two projections 60 which are positioned about 1800 from each other. Each projection 60 defines an opening 64 therethrough, which will accommodate fingers of a tool to help remove the tread ring 38 if it should become locked or frozen onto the support portions 30,32.

Figure 4:
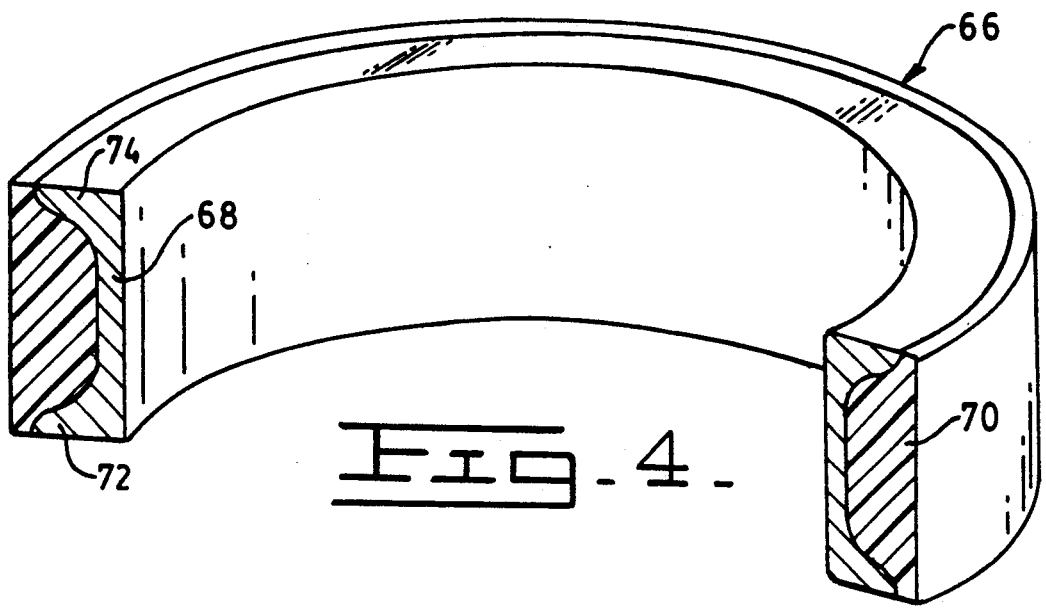
FIG. 4 is a diagrammatic perspective view, partly in section, of second embodiment of a composite tread ring of the present invention.

With particular reference to FIG. 4, a second embodiment of a composite tread ring 66 includes a metal inner base portion 68 and a non-metallic outer tread portion 70. The base portion 68 is U-shaped in cross-section and includes first and second side legs 72,74. The side legs 72,74 are adapted to enclose portions of the non-metallic tread portion 70, and the base portion 68 and tread portion 70 are bonded together. Although not illustrated, the base portion could include outwardly extending projections, similar to the projections 60 on the tread ring 38.

Figure 5:
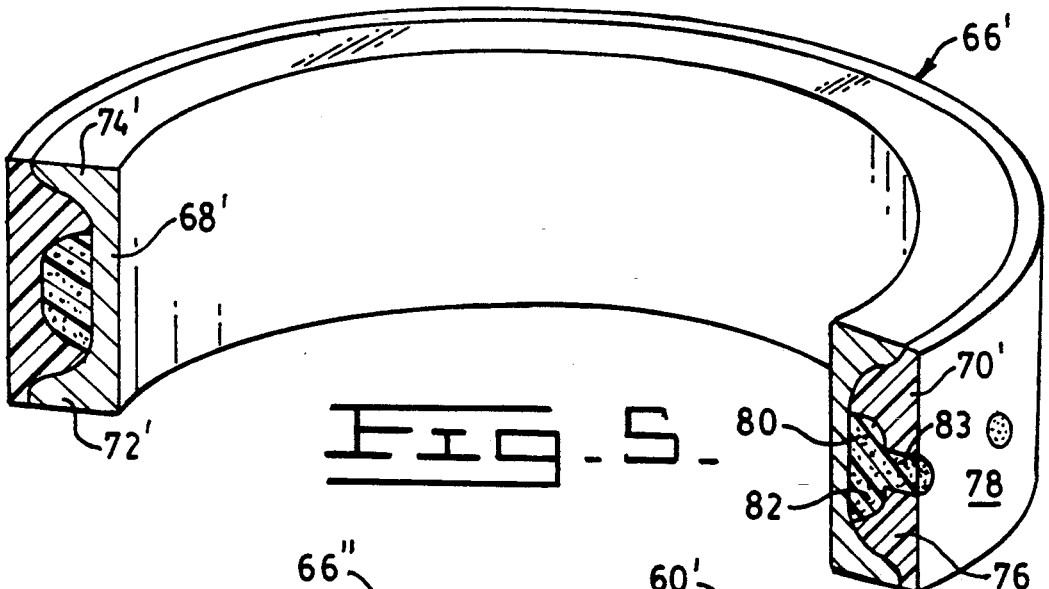
FIG. 5 is a diagrammatic perspective view, partly in section, of a third embodiment of a composite tread ring of the present invention.

With particular reference to FIG. 5, a third embodiment of a composite tread ring 66' is illustrated. Tread ring 66' is similar to the tread ring 66 and includes a metal inner base portion 68' and a non-metallic outer tread portion 70'. As in the previous embodiment, the base portion 68' is Unshaped in cross-section and includes first and second side legs 72',74' which enclose portions of the non-metallic tread portion 70'. The non-metallic tread portion 70' includes an outer segment 76 having a tread surface 78, and an inner segment 80 positioned between the outer segment 76 and the base portion 68'. In order to enhance the heat conducting properties of the inner segment 80, a plurality of metallic particles 82 are dispersed therein. To further enhance the heat conducting properties, the inner segment 80 can include a plurality of columns 83 extending through the outer segment 76 and terminating at the tread surface 78. The number and orientation of the columns 83 can be varied to obtain optimum heat transfer between the inner segment 80 and the tread surface 78.

Figure 6:
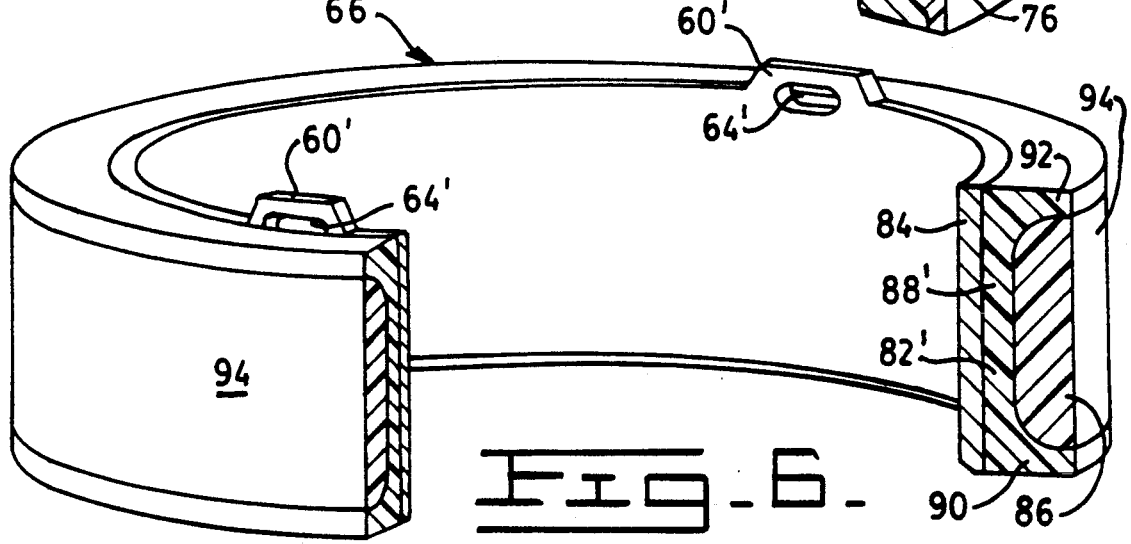
FIG. 6 is a diagrammatic perspective view, partly in section of a fourth embodiment of a composite tread ring of the present invention.

With particular reference to FIG. 6, a fourth embodiment of a composite tread ring 66" is illustrated. As in the previous embodiments, the tread ring 6611 includes a metal inner base portion 84 and a non-metallic outer tread portion 86. Tread ring 66" includes a non-metallic middle portion 88 positioned between the outer tread portion 86 and the inner base portion 84. The middle portion 88 has a U-shape in cross-section and includes first and second legs 90,92 which enclose portions of the outer tread portion 86. The legs 90,92 extend to the tread surface 94 of the tread portion 86. The middle portion 88 is bonded to the base portion 84 and to the tread portion 86, and has a plurality of metallic particles 82' dispersed therein. If desirable, a plurality of columns, such as columns 83 in the previous embodiment, can extend from the middle portion 88 to the tread surface 94. The inner base portion 84 has a plurality of projections 60', with each projection having an opening 64'. Preferably, the non-metallic portions of each embodiment are comprised of urethane, although other non-metallics could be used.

INDUSTRIAL APPLICABILITY

With reference to the drawings, the subject track roller assembly 10 and replaceable composite tread ring 38 are particularly useful for reducing wear of the link rails 12 and for increasing the life of the undercarriage components. The subject invention also provides for easy replacement of the replaceable flange plates 20 and the composite tread rings 38.

After extended periods of operation of the track roller assembly 10, the tread portion 42 of the tread ring 38 may become worn and require replacement. Also, the flange plate 20 may become worn and need to be replaced or repaired. To accomplish replacement of the flange plate 20 or the tread ring 38, the threaded fasteners 50 are removed, which allows the flange plate 20 to be removed. The tread ring 38 can be then be removed since it is held in place by the flange plate 20. If the tread ring should be frozen onto the support portions 30,32 a pulling tool can be inserted into the openings 64 of the projections 60 and the tread ring 38 will be forcibly pulled from the support portions 30,32. Since the seal plate 18 remains secured in place by the threaded fasteners 48, the resilient seals 54 and the metal to metal seals 56 remain undisturbed and lubricant within the roller assembly 10 is not lost.

A new tread ring 38 is now positioned onto the support portions 30,32 and a new or repaired flange plate 20 is secured in place by the threaded fasteners 50. The roller assembly is now ready to be placed back in service.

Other aspects, objects and advantages of this invention can be obtained from a study of the drawings, the disclosure, and the appended claims.

We claim:

1. A track roller assembly for guiding and supporting an endless track of a self-laying track-type vehicle, comprising:
   a shaft adapted to be secured to the vehicle;
   a hub member having a flange portion and a support portion, said hub member being rotatably mounted on said shaft;
   a seal plate;
   a plurality of first fasteners adapted to releasably secure said seal plate to said hub member;
   a replaceable tread ring mounted on said support portion of said hub member;
   a replaceable flange plate adapted to engage said tread ring and to engage and encircle said seal plate; and
   a plurality of second fasteners adapted to releasably secure said flange plate to said hub member.

2. A track roller assembly, as set forth in claim 1, wherein said tread ring has a first inner diameter D, and said support portion has a second outer diameter d, said first diameter D being greater than said second diameter d.

3. A track roller assembly, as set forth in claim 1, wherein said tread ring has a side surface and a projection extending outwardly of said side surface.

4. A track roller assembly, as set forth in claim 3, wherein said flange plate has a cavity adapted to receive said projection.

5. A track roller assembly, as set forth in claim 1, wherein said tread ring has a said surface and a plurality of projections extending outwardly of said side surface.

6. A track roller assembly, as set forth in claim 5, wherein at least two of said projections are positioned about 180° from each other.

7. A track roller assembly, as set forth in claim 5, wherein said flange plate has a plurality of cavities, each of said cavities being adapted to receive one of said projections.

8. A track roller assembly, as set forth in claim 6, wherein said flange plate has a plurality of cavities, two of said cavities being adapted to receive said two projections which are positioned about 180° from each other.

9. A track roller assembly, as set forth in claim 1, wherein said second fasteners extend through said flange plate and said seal plate.

10. A track roller assembly, as set forth in claim 6, wherein each of said two projections defines an opening therethrough.

11. A track roller assembly, as set forth in claim 1, including a plurality of seals positioned between said shaft and said hub member, said seal plate being adapted to maintain said seals in place when said flange plate is removed.

12. A track roller assembly, as set forth in claim 1, wherein said replaceable tread ring has an inner metallic base portion and an outer non-metallic tread portion, said base and tread portions being bonded together.

13. A track roller assembly, as set forth in claim 12, wherein said metal base portion is U-shaped in cross-section and includes side legs which are adapted to enclose portions of said non-metallic tread portion.

14. A track roller assembly, as set forth in claim 12, wherein said non-metallic tread portion includes an outer region having a tread surface and an inner region positioned between said outer region and said base portion, said inner region having a plurality of metallic particles dispersed therein.

15. A track roller assembly, as set forth in claim 14, wherein said inner region includes a plurality of columns extended through said outer region and to said tread surface.

* * * * *